(12) United States Patent
Vacca

(10) Patent No.: US 10,532,652 B2
(45) Date of Patent: Jan. 14, 2020

(54) FLAP PANEL AND MOTOR VEHICLE

(71) Applicant: Valeo Systemes Thermiques, Le Mesnil Saint Denis (FR)

(72) Inventor: Frédéric Vacca, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 73 days.

(21) Appl. No.: 15/575,861

(22) PCT Filed: May 17, 2016

(86) PCT No.: PCT/EP2016/061045
§ 371 (c)(1),
(2) Date: Nov. 21, 2017

(87) PCT Pub. No.: WO2016/192984
PCT Pub. Date: Dec. 8, 2016

(65) Prior Publication Data
US 2018/0126841 A1 May 10, 2018

(30) Foreign Application Priority Data

May 29, 2015 (FR) ...................... 15 54893

(51) Int. Cl.
*B60K 11/08* (2006.01)
*F16C 1/02* (2006.01)
*F16H 19/00* (2006.01)

(52) U.S. Cl.
CPC .............. *B60K 11/085* (2013.01); *F16C 1/02* (2013.01); *F16H 19/001* (2013.01)

(58) Field of Classification Search
CPC ......... B60K 11/08; B60K 11/085; F16C 1/02; F16C 1/04; F16H 19/001; F16H 19/003; Y10T 10/82; Y02T 10/88
See application file for complete search history.

(56) References Cited

U.S. PATENT DOCUMENTS 4,924,826 A * 5/1990 Vinson ...................... F01P 7/12
123/195 C
6,854,544 B2 * 2/2005 Vide .................... B60K 11/085
180/68.1

(Continued)

FOREIGN PATENT DOCUMENTS

DE 20 2005 010683 U1 9/2005
DE 10 2008 006020 A1 7/2009

(Continued)

OTHER PUBLICATIONS

International Search Report issued in PCT/EP2016/061045 dated Jul. 18, 2016 (3 pages).

(Continued)

*Primary Examiner* — Adam D Rogers
(74) *Attorney, Agent, or Firm* — Osha Liang LLP

(57) ABSTRACT

The invention relates to a panel (6) of flaps (9) for an air intake (2, 3) of a motor vehicle (1) comprising a plurality of flaps (9) mounted with the ability to pivot about a respective longitudinal axis of pivoting (A), the longitudinal axes of pivoting (A) extending parallel to one another and being arranged side by side, characterized in that the alignment of the longitudinal axes of pivoting (A) lies within a curved surface (S). The invention also relates to a motor vehicle (1) comprising such a panel (6) of flaps (9).

10 Claims, 4 Drawing Sheets

(56) References Cited

U.S. PATENT DOCUMENTS

Figure 1:
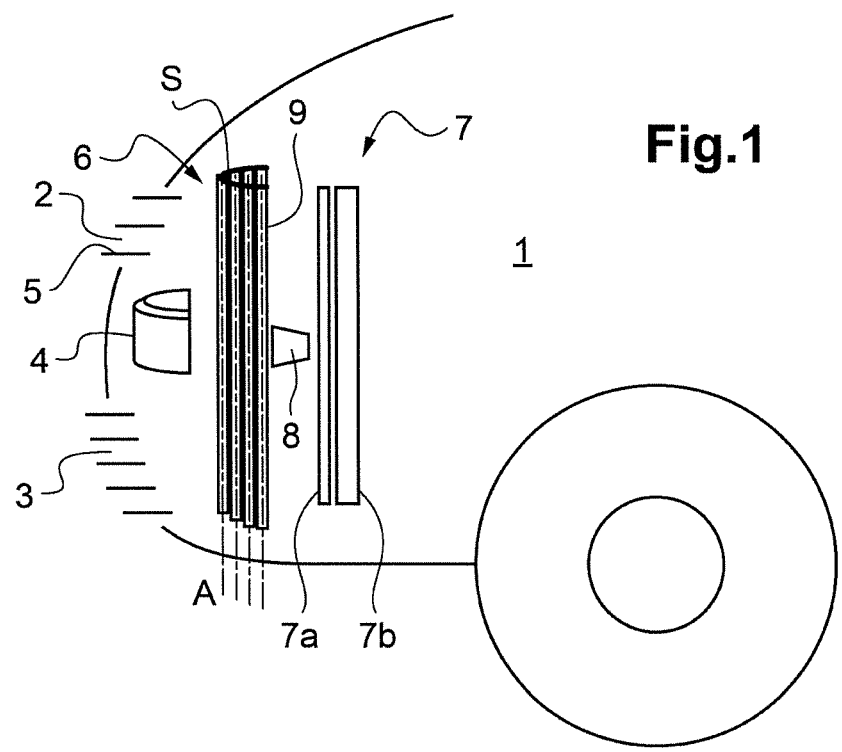

| | | | | |
|---|---|---|---|---|
| 9,694,858 B2* | 7/2017 | Wolf | .................... | B62D 37/02 |
| 9,926,833 B2* | 3/2018 | Wolff | ....................... | F01P 7/12 |
| 9,975,421 B2* | 5/2018 | Froling | ................. | B60K 11/04 |
| 10,071,625 B1* | 9/2018 | Stoddard | ............. | B60K 11/085 |
| 2006/0211364 A1 | 9/2006 | Brotz et al. | | |
| 2017/0361699 A1* | 12/2017 | Wiech | ................. | B60K 11/085 |

FOREIGN PATENT DOCUMENTS

| | | | | |
|---|---|---|---|---|
| DE | 10 2011 006114 A1 | 9/2012 | | |
| DE | 10 2013 107974 A1 | 2/2015 | | |
| DE | 102016004369 A1 * | 10/2017 | ........... | B60K 11/085 |
| FR | 3048645 A1 * | 9/2017 | ........... | B60K 11/085 |

OTHER PUBLICATIONS

Written Opinion of the International Searching Authority issued in PCT/EP2016/061045 dated Jul. 18, 2016 (5 pages).

* cited by examiner

Fig.6a    Fig.6b    Fig.6c
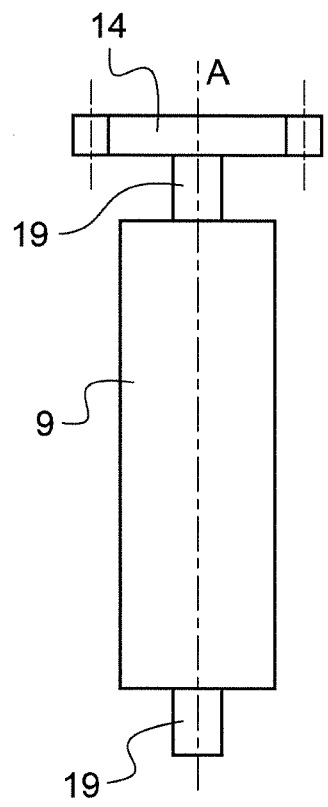
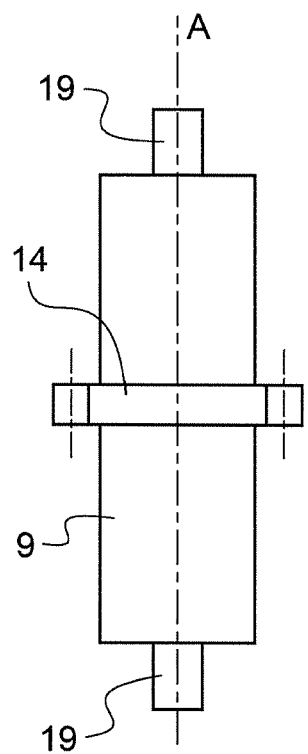
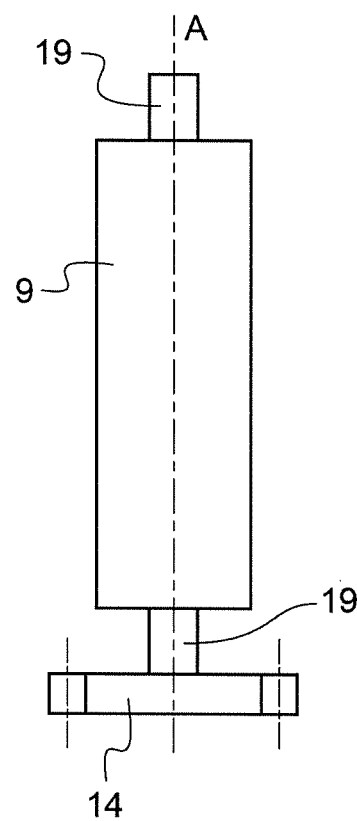
Fig.7
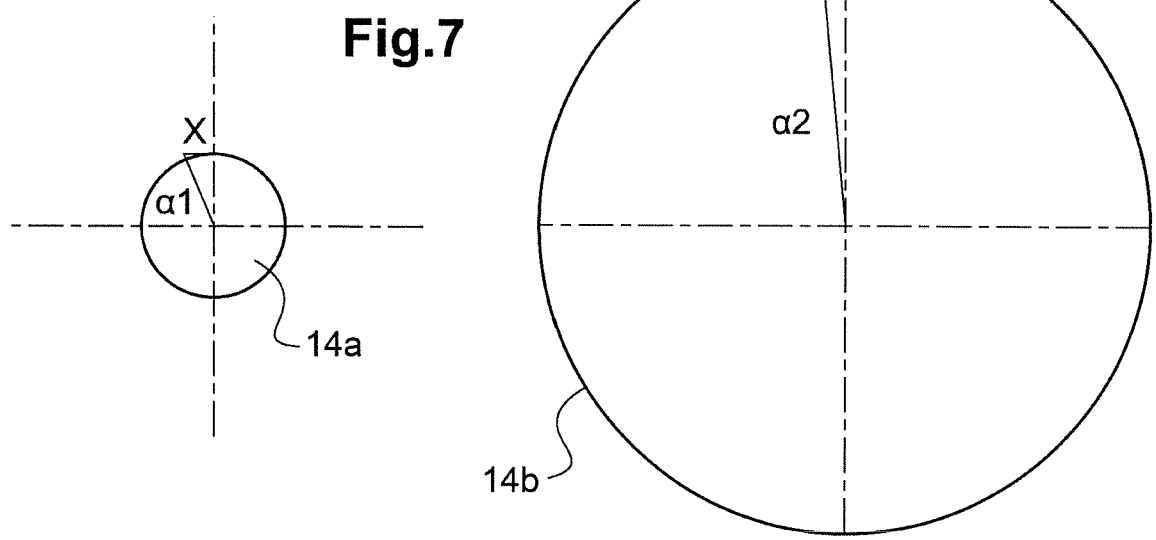

FLAP PANEL AND MOTOR VEHICLE

BACKGROUND OF THE INVENTION

The invention concerns a flap panel for an air intake of a motor vehicle and a motor vehicle equipped with at least one flap panel.

The front faces of motor vehicles generally consist of a principal air intake or two air intakes termed the upper path and the lower path separated by a bumper beam. The heat exchangers of the motor vehicle, for example that used for the air conditioning of the passenger compartment, are generally placed behind this bumper beam.

The flap panel is generally also mounted behind the air intakes of the vehicle.

The flaps take the form of transverse slats pivotably mounted on the panel. The inclination of the flaps can be controlled between a vertical blanking position blocking the passage of air and a plurality of intermediate positions leading to a horizontal open position in which a maximum flow of air can circulate.

When the flap panel is closed, the vehicle has a better air penetration coefficient, which makes it possible to reduce fuel consumption and $CO_2$ emission. Moreover, the controlled flaps are disposed in front of a heat exchange system which makes it possible in the closed position to accelerate the rise in temperature of the exchangers in the heating phase whilst also reducing the consumption of the vehicle and therefore the $CO_2$ emission.

However, the space available under the hood between the bumper beam and the heat exchangers is relatively small, which can complicate the integration of the panel of controlled flaps with other components such as the parking assistance radar.

Moreover there is the aim to improve the efficacy of the flap panel in the open position.

BRIEF SUMMARY OF THE INVENTION

One object of the present invention is to propose a flap panel enabling better optimization of the space available under the hood of the vehicle. Another object of the present invention is to improve the efficacy of the flap panel in the open position.

To this end the invention consists in a flap panel for an air intake of a motor vehicle comprising a plurality of flaps mounted with the ability to pivot about a respective longitudinal pivot axis, the longitudinal pivot axes extending parallel to one another and being disposed side by side, characterized in that the aligned longitudinal pivot axes lie within a curved surface.

It is therefore possible to obtain a flap panel the shape of which can follow that of the elements situated in front of it, such as the bumper beam, the radiator grille or other reinforcing elements of the vehicle.

The flap panel can be moved as close as possible to the air intakes of the vehicle, which makes it possible to increase the space available under the hood.

The increased distance between the flap panel and the heat exchange system makes it possible to obtain a less turbulent, more laminar, faster and therefore more effective flow of air for cooling the heat exchangers.

Also, the increase in the space under the hood provides room for arranging other components of the vehicle between the heat exchanger system and the flap panel, such as in particular a detection radar or a horn.

Moreover, the length of the flaps arranged vertically is reduced compared to the prior art flaps arranged horizontally and their number is increased by around 15 to 20%. The flaps therefore have a better resistance to bending and the flap panel has a better resistance in the closed position to the pressure of air or of water in particular (for example when crossing a ford).

According to one or more features of the flap panel, separately or in combination,
- the curved surface has a convex curvature and the convex curvature projects toward the front of the motor vehicle, for example,
- the flap panel includes at least one flexible drive shaft connected to the flaps extending perpendicularly to the longitudinal pivot axes of the flaps. The flexible drive shaft enables the latter to follow the curved surface in which the aligned longitudinal pivot axes lie.
- the flap panel includes a rotary actuator connected to the flexible drive shaft configured to drive the flexible drive shaft in rotation,
- the flap panel includes a pinion mounted on each flap coaxially with the longitudinal pivot axis and the flexible drive shaft includes at least one lead screw meshing with the pinions,
- the flexible drive shaft includes at least two adjacent lead screws of opposite sense meshing with pinions having teeth with opposite helix angles. Accordingly, the same direction of rotation of the flexible drive shaft having opposite helix angles can cause the flaps to pivot at the same time in contrary rotation directions on either side of a concave portion of the drive shaft.
- the flap panel includes at least one linear actuator connected to the flexible drive shaft configured to move the flexible drive shaft in a linear manner,
- the flap panel includes a pinion mounted on each flap coaxially with the longitudinal pivot axis and the flexible drive shaft includes a rack meshing with the pinions,
- at least two pinions have diameters with different dimensions. Thus the pivoting of the flaps can be matched to the radius of curvature of the flap panel.
- the largest pinion meshes with the center of a concave portion of the flexible drive shaft and the pinions are arranged from the largest to the smallest starting from the concave portion of the flexible drive shaft in a symmetrical manner,
- the flap panel includes an actuator connected to one end of the flexible drive shaft arranged on one side of the flap panel. This makes it possible to offset the actuator outside a front central zone of the vehicle to prevent it from being damaged in the event of a frontal collision of the vehicle,
- the parallel longitudinal pivot axes are intended to be disposed vertically in the motor vehicle.

The invention also consists in a motor vehicle characterized in that it includes at least one flap panel as described above disposed behind at least one air intake of the motor vehicle, the longitudinal pivot axes of the flaps of the flap panel being disposed vertically in the vehicle.

BRIEF DESCRIPTION OF THE SEVERAL VIEWS OF THE DRAWING(S)

Figure 2:
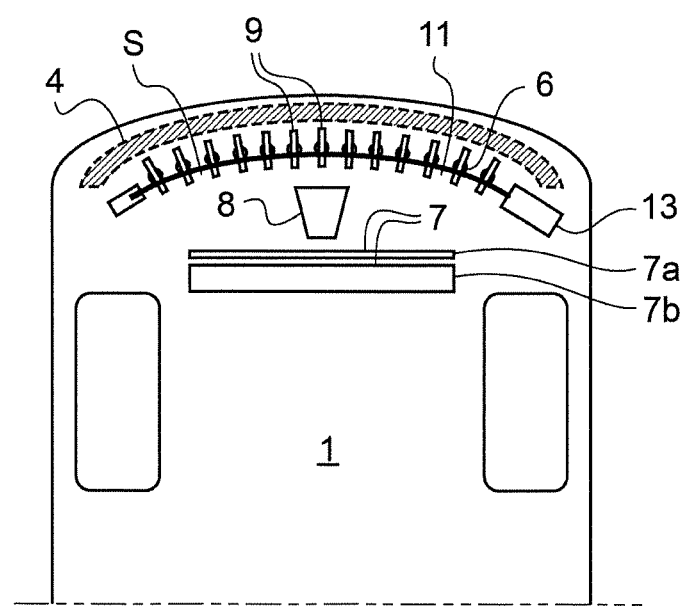
Figure 3:
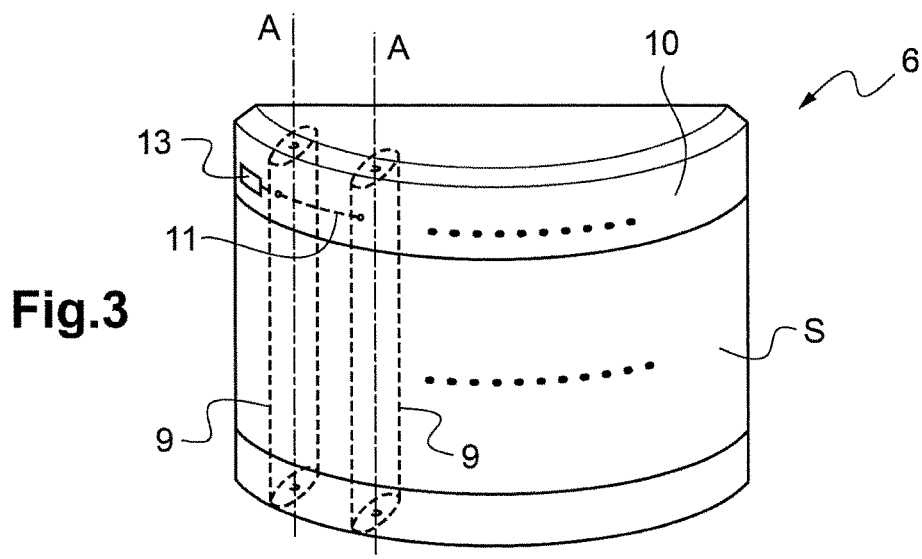
Figure 4:
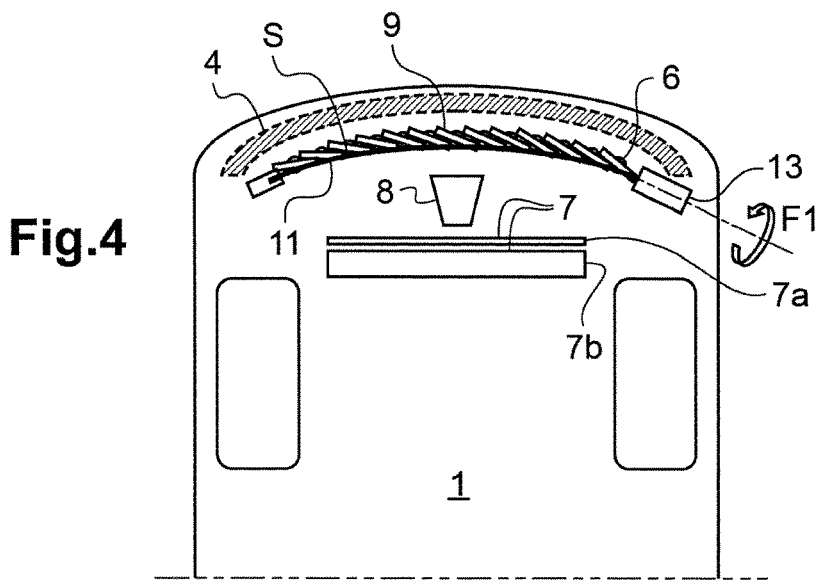
Figure 5A:
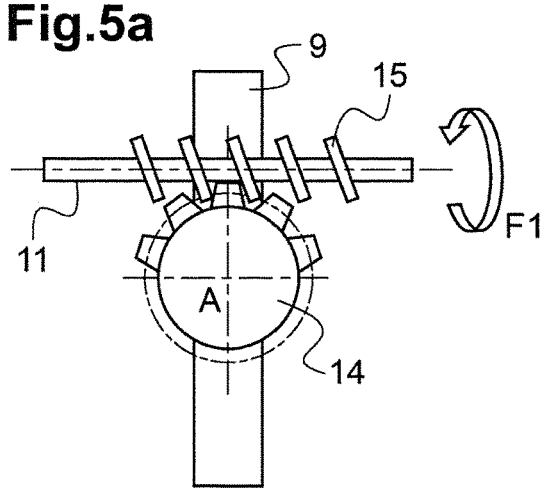
Figure 5B:
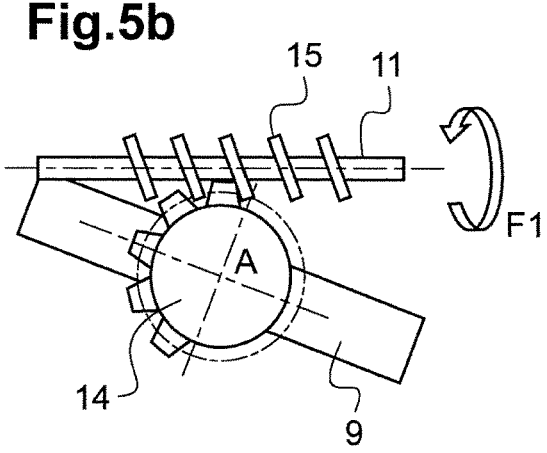
Figure 8:
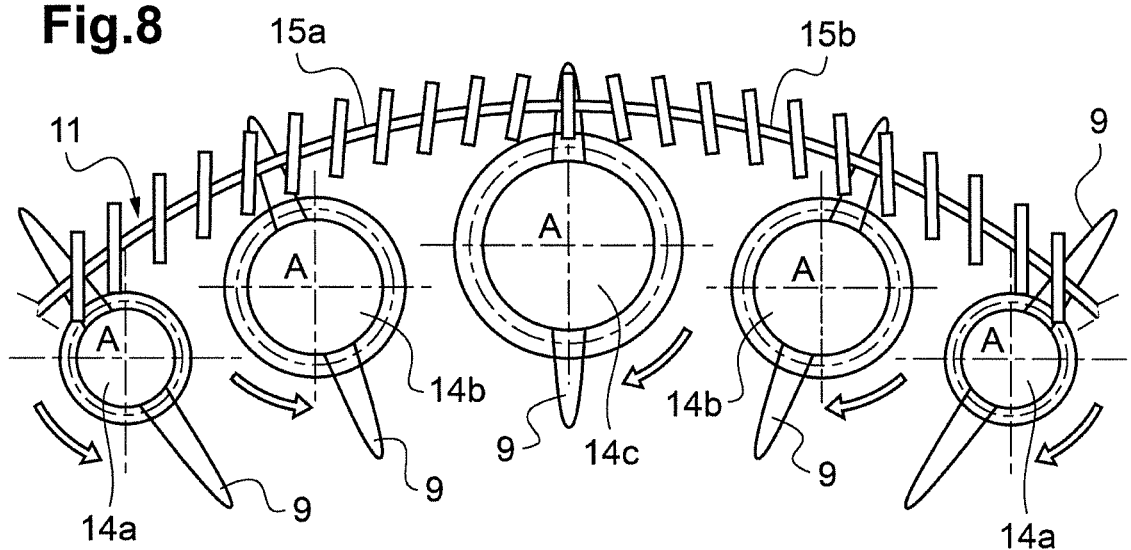
Figure 9:
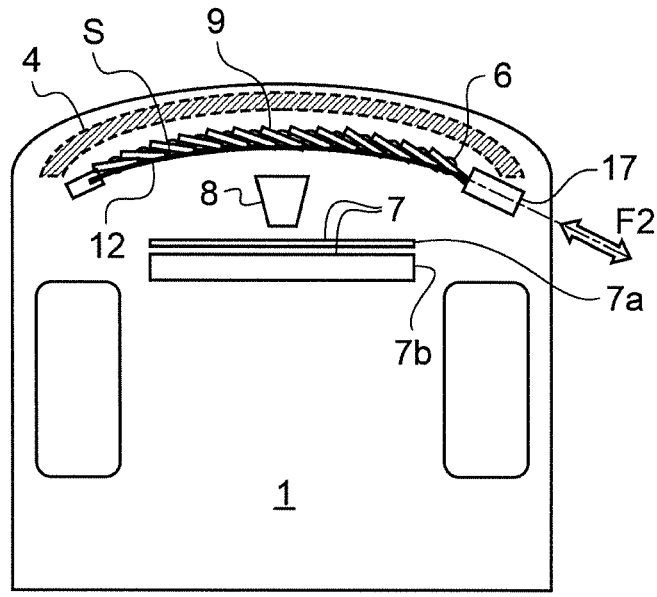
Figure 10A:
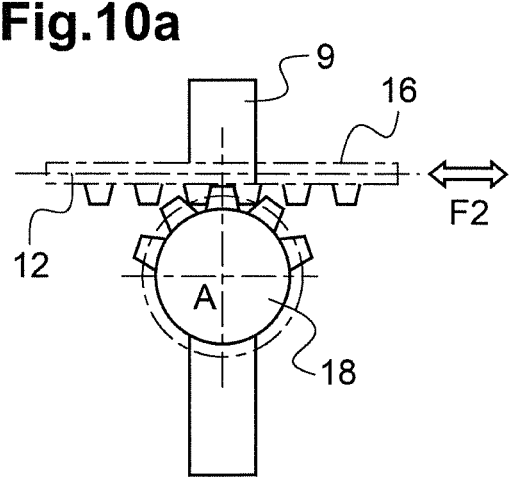
Figure 10B:
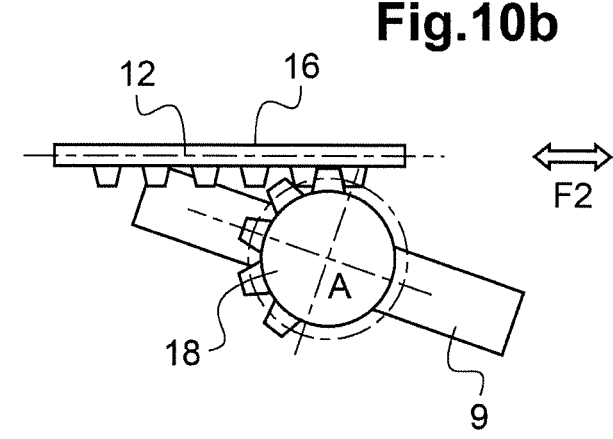

Other features and advantages of the invention will become more clearly apparent on reading the following description given by way of illustrative and nonlimiting example and from the appended drawings, in which:

FIG. 1 shows a diagrammatic side view in vertical section of a flap panel mounted in a motor vehicle, FIG. 2 shows a diagrammatic view in horizontal section of elements of the motor vehicle from FIG. 1, FIG. 3 shows a diagrammatic view in horizontal section of one embodiment of the flap panel in the open position, FIG. 4 shows a view similar to FIG. 2 with the flap panel in the closed position and an actuator according to a first embodiment, FIG. 5a shows a detail of the flap panel from FIG. 4 in the open position, FIG. 5b shows a view similar to FIG. 5a in an intermediate open position, FIG. 6a shows a detail of a flap panel according to another embodiment, FIG. 6b shows a detail of a flap panel according to another embodiment, FIG. 6c shows a detail of a flap panel according to another embodiment, FIG. 7 is a diagram showing the rotation angle traveled by a flap as a function of the diameter of a pinion, FIG. 8 shows a diagrammatic view in horizontal section of elements of a flap panel in the open position, FIG. 9 shows a view similar to FIG. 2 with the flap panel in the closed position and an actuator according to a second embodiment, FIG. 10a shows a detail of the flap panel from FIG. 9 in the open position, and FIG. 10b shows a view similar to FIG. 10a in an intermediate position.

DETAILED DESCRIPTION OF THE INVENTION

In these figures, substantially identical elements carry the same references.

The following embodiments are examples. Although the description refers to one or more embodiments, this does not necessarily mean that each reference concerns the same embodiment or that features apply only to only one embodiment. Single features of different embodiments can equally be combined to provide other embodiments.

The front/rear directions are designated with reference to the direction of movement of the motor vehicle and the vertical/horizontal directions are designated with reference to the vehicle.

FIG. 1 represents an example of a motor vehicle 1.

The motor vehicle 1 includes one or two air intakes 2, 3, respectively termed the upper path and the lower path, provided at the front of the vehicle 1, separated by a bumper beam 4 behind the grilles constituting the radiator grille 5 of the vehicle 1. The air intakes 2 and 3 are mounted one above the other on opposite sides of the bumper beam 4.

The motor vehicle 1 also includes at least one panel 6 of flaps 9 arranged between the bumper beam 4 and a heat exchanger system 7. The heat exchanger system 7 includes one or more heat exchangers such as a condenser 7a and/or a radiator 7b.

The panel 6 of flaps 9 can be mounted in an air guide (not shown) for channeling air from the air intakes 2, 3 to the heat exchanger system 7.

When the vehicle 1 includes two air intakes 2, 3 the vehicle 1 can include two panels 6 of flaps 9 disposed behind respective air intakes 2, 3. The two panels 6 of flaps 9 can be independent of each other. Alternatively, the vehicle 1 includes a single panel 6 of flaps 9 disposed behind the two air intakes 2, 3 in a common channel.

Seen better in FIGS. 2 and 3, the panel 6 of flaps 9 consists of a plurality of flaps 9.

The flaps 9 (or slats) extend along a respective longitudinal pivot axis A about which they are pivotably mounted.

The flaps 9 are mounted in a curved frame 10 of the panel 6 of flaps 9. The longitudinal pivot axes A are disposed alongside one another and extend parallel to one another so that when the panel 6 of flaps 9 is in the closed position the flaps 9 blank off the air inlets 2, 3 completely.

The aligned longitudinal pivot axes A lie within a curved surface S (or curvilinear surface) other than a plane. This can be a surface of any shape except totally plane, such as convex or partially convex, and can be partially plane.

Moreover, the longitudinal pivot axes A extend vertically when the panel 6 of flaps 9 is mounted in the motor vehicle 1 (FIG. 1).

In this way it is possible to obtain a panel 6 of flaps 9 the shape of which can follow the shape of the elements disposed in front of the panel 6 of flaps 9, such as the bumper beam 4, the radiator grille 5 or other reinforcing elements of the vehicle 1. Thus the panel 6 of flaps 9 has for example a convex curvature projecting toward the front of the vehicle 1 (FIG. 2). The flaps 9 are then arranged concentrically in the open position.

The panel 6 of flaps 9 can therefore be moved as close as possible to the air intakes 2, 3 of the vehicle 1, which makes it possible to increase the space available under the hood.

The distance between the panel 6 of flaps 9 and the heat exchanger system 7 can be increased, making it possible to obtain a less turbulent and therefore more laminar, faster and more effective flow of air for cooling the heat exchangers.

Also, the increase in the space under the hood leaves room for arranging other components of the vehicle 1 between the heat exchanger system 7 and the panel 6 of flaps 9, such as in particular a detection radar 8 or a horn.

Moreover, the length of the vertically disposed flaps 9 is reduced compared to the disposed horizontally flaps of prior art panels and their number is increased by around 15 to 20%. The flaps 9 therefore have greater resistance to bending and the panel 6 of flaps 9 has a greater resistance in the closed position in particular to the pressure of air or water (for example when crossing a ford).

The longitudinal pivot axis A can be a central axis of the flap 9, such as a longitudinal axis of symmetry of the flap 9 if the flaps 9 have a symmetrical profile, or an axis at the end of the flap 9. The longitudinal pivot axis A is materialized by two pivots 19 of the panel 6 of flaps 9 at the two longitudinal ends of each flap 9 mounted in bearings of the frame 10. The flaps 9 are all identical for example.

The panel 6 of flaps 9 further includes at least one flexible drive shaft 11 connected to the flaps 9 to drive pivoting of the flaps 9. The flexible drive shaft can flex, which enables it to follow the curved surface S in which the aligned longitudinal pivot axes A lie.

The flexible drive shaft 11 extends perpendicularly to the longitudinal pivot axes A of the flaps 9.

The panel 6 of flaps 9 also includes an actuator 13 connected to the flexible drive shaft 11 to drive pivoting of the flaps 9 about their longitudinal pivot axis A.

The flexible drive shaft 11 is connected to the flaps 9 on one side of the flap 9, i.e. away from the longitudinal pivot axis A, for example on the same side of the longitudinal pivot axis A for all the flaps 9.

The actuator 13 is for example connected to one end of the flexible drive shaft 11. It can therefore be arranged on one side of the panel 6 of flaps 9. This makes it possible to move the actuator 13 away from a front central area of the vehicle 1 to prevent it from being damaged in the event of the vehicle 1 sustaining a front-end collision.

According to a first embodiment shown in FIGS. 4, 5*a* and 5*b*, 8, the actuator 13 is a rotary actuator. It is configured to drive rotation of the flexible drive shaft 11 about its axis.

To this end, according to one embodiment that can be seen in FIGS. 5*a* and 5*b*, the panel 6 of flaps 9 includes a pinion 14 mounted on each flap 9 coaxially with the longitudinal pivot axis A.

As can be seen in the case of the examples illustrated by FIGS. 6*a*, 6*b* and 6*c*, the pinion 14 can be disposed at an upper end of the flap 9 (FIG. 6*a*) or at a lower end of the flap 9 (FIG. 6*c*), on one of the two pivots 19 associated with each flap 9. According to another example, the pinion 14 is arranged between the two ends of the flap 9, for example in the middle (FIG. 6*b*), the flap 9 then being divided into upper and lower parts constrained to rotate together.

The flexible drive shaft 11 includes at least one lead screw 15 with helicoidal teeth meshing with the pinions 14. The flexible drive shaft 11 is made of plastic for example and produced by a molding process.

Referring to FIGS. 4, 5*a* and 5*b*, in operation the driving of the flexible shaft 11 in rotation by the rotary actuator 13 as shown by the arrow F1 causes the rotation of the pinions 14 which causes the pivoting of the flaps 9 in the same direction from an open position (FIG. 5*a*) to an intermediate open position (FIG. 5*b*).

According to one embodiment, the flaps 9 pivot in opposite directions on either side of a concave portion of the panel 6 of flaps 9, such as at the center of the convex surface S.

To this end, the flexible drive shaft 11 includes at least two lead screws 15*a*, 15*b*. The teeth of the first and second lead screws 15*a*, 15*b* are helicoidal, adjacent and of opposite senses starting from the center of the flexible drive shaft 11.

The pinions 14*a*, 14*b* meshing with the first lead screw 15*a* have an opposite helix angle to the pinions 14*a*, 14*b*, 14*c* meshing with the second lead screw 15*b*. In FIG. 8 the pinions 14*a*, 14*b* meshing with the first lead screw 15*a* oriented to the left turn in the anticlockwise direction and the pinions 14*a*, 14*b*, 14*c* meshing with the second lead screw 15*b* oriented to the right turn in the clockwise direction. The same rotation direction of the flexible drive shaft 11 having two helix angles causes the flaps 9 to pivot at the same time in contrary rotation directions on either side of the concave portion of the drive shaft 11.

Alternatively, two actuators 13 and two flexible drive shafts 11 with lead screws are provided and turn independently in opposite directions to produce contrary pivoting directions of the flaps 9.

According to one embodiment, at least two pinions 14*a*, 14*b*, 14*c* have diameters with different dimensions. The pivoting of the flaps 9 can therefore be matched to the radius of curvature of the panel 6 of flaps 9.

The larger the diameter of the pinion the smaller the rotation angle traveled by the flap 9, as shown in FIG. 7 where, for the same linear displacement X generated by the rotation of the flexible drive shaft 11, the rotation angle α1 traveled by the small diameter pinion 14*a* is greater than the rotation angle α2 traveled by the larger diameter pinion 14*b*. Thus the pinions 14*a* of smaller diameter mesh on either side of the center of the flexible drive shaft 11 farther from the center than the pinions 14*b* of larger diameter.

In the case of a panel 6 of flaps 9 having a convex curvature, the largest pinion 14*c* meshes with the center of the flexible drive shaft 11. The other pinions 14*a*, 14*b* are arranged from the largest 14*b* to the smallest 14*a* starting from the concave portion toward the ends and symmetrically relative to the concave portion (FIG. 8). Accordingly, the rotation angle of the flaps 9 is modulated as a function of the diameters of the pinions 14*a*, 14*b* and 14*c*.

The inclination of the flaps 9 can therefore be controlled between a closed position in which the flaps 9 lie substantially in the curved surface S and blank off the air passage and a plurality of intermediate positions leading to an open position in which the flaps 9 are substantially perpendicular to the curved surface S and in which a maximum flow of air can circulate between the flaps 9.

FIGS. 9, 10*a* and 10*b* illustrate a second embodiment.

This embodiment differs from the previous one in that the actuator 17 is configured to displace the flexible drive shaft 12 in its axial direction in a linear manner.

To this end, according to an embodiment that can be seen in FIGS. 7*a* and 7*b*, the panel 6 of flaps 9 includes a pinion 18 mounted on each flap 9 coaxially with the longitudinal pivot axis A. The pinion 18 has straight teeth.

The flexible drive shaft 12 includes a rack 16 (or toothed belt) meshing with the pinions 18. It is made of plastic for example and produced by a molding process.

In operation the driving of the flexible shaft 12 by the linear actuator 17 in the direction of the arrow F2 causes rotation of the pinions 18 causing pivoting of the flaps 9 in the same sense from an open position (FIG. 10*a*) to an intermediate open position (10*b*).

It is also possible to provide two actuators 17 and two flexible drive shafts 12 with a rack that are actuated independently in opposite directions to produce opposite directions of pivoting of the flaps 9.

The invention claimed is:

1. A panel for an air intake of a motor vehicle comprising:
a plurality of flaps mounted with the ability to pivot about a respective longitudinal pivot axis, the longitudinal pivot axes extending parallel to one another and being disposed side by side;
at least one flexible drive shaft connected to the flaps extending perpendicularly to the longitudinal pivot axes of the flaps; and
a rotary actuator connected to the at least one flexible drive shaft configured to drive the at least one flexible drive shaft in rotation,
wherein the aligned longitudinal pivot axes lie within a curved surface.

2. The panel as claimed in claim 1, wherein the curved surface has a convex curvature.

3. The panel as claimed in claim 1, further comprising a pinion mounted on each flap coaxially with the longitudinal pivot axis for each flap, the at least one flexible drive shaft including at least one lead screw meshing with the pinions having teeth with opposite helix angles.

4. The panel as claimed in claim 1, further comprising a pinion mounted on each flap coaxially with the longitudinal pivot axis for each flap, wherein the at least one flexible drive shaft includes at least two adjacent lead screws of opposite sense meshing with the pinions having teeth with opposite helix angles.

5. The panel as claimed in claim 3, wherein at least two of the pinions have diameters with different dimensions.

6. The panel as claimed in claim 5, wherein the pinion with a largest diameter meshes with the center of a concave portion of the at least one flexible drive shaft, the pinions being arranged from the largest to the smallest starting from the concave portion of the at least one flexible drive shaft in a symmetrical manner.

7. The panel as claimed in claim 1, wherein the rotary actuator is connected to one end of the at least one flexible drive shaft and is arranged on one side of the panel.

8. The panel as claimed in claim 1, wherein the parallel longitudinal pivot axes are disposed vertically in the motor vehicle.

9. A panel for an air intake of a motor vehicle comprising:
    a plurality of flaps mounted with the ability to pivot about a respective longitudinal pivot axis, the longitudinal pivot axes extending parallel to one another and being disposed side by side,
    at least one flexible drive shaft connected to the flaps extending perpendicularly to the longitudinal pivot axes of the flaps,
    at least one linear actuator connected to the at least one flexible drive shaft configured to move the at least one flexible drive shaft in a linear manner, and
    a pinion mounted on each flap coaxially with the longitudinal pivot axis for each flap, the at least one flexible drive shaft including a rack meshing with the pinions,
    wherein the aligned longitudinal pivot axes lie within a curved surface.

10. A motor vehicle comprising at least one panel disposed behind at least one air intake of the motor vehicle, wherein the panel comprises:
    a plurality of flaps mounted with the ability to pivot about a respective longitudinal pivot axis, the longitudinal pivot axes extending parallel to one another and being disposed side by side;
    at least one flexible drive shaft connected to the flaps extending perpendicularly to the longitudinal pivot axes of the flaps; and
    a pinion mounted on each flap coaxially with the longitudinal pivot axis for each flap,
    wherein the panel further comprises:
        a rotary actuator connected to the at least one flexible drive shaft configured to drive the at least one flexible drive shaft in rotation, the at least one flexible drive shaft including at least one lead screw meshing with the pinions having teeth with opposite helix angles; or
        a linear actuator connected to the at least one flexible drive shaft configured to move the at least one flexible drive shaft in a linear manner, the at least one flexible drive shaft including a rack meshing with the pinions, and
    wherein the aligned longitudinal pivot axes lie within a curved surface, and
    wherein the longitudinal pivot axes of the flaps of the panel are disposed vertically in the motor vehicle.

* * * * *